UNITED STATES PATENT OFFICE.

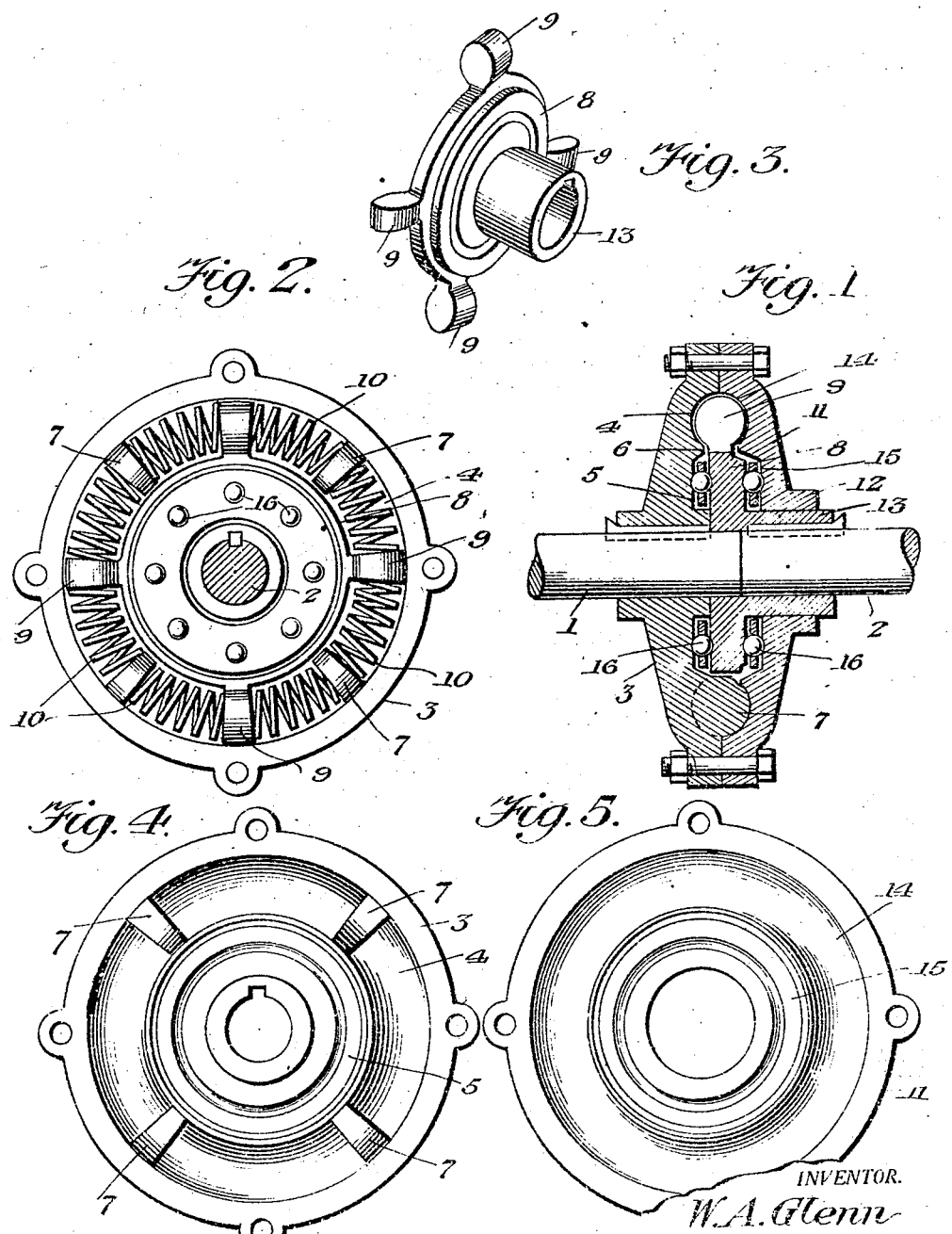

WILLIAM ARTHUR GLENN, OF WASHINGTON, DISTRICT OF COLUMBIA, ASSIGNOR OF ONE-THIRD TO CLARENCE A. RYE, OF WASHINGTON, DISTRICT OF COLUMBIA.

AUTO ATTACHMENT.

1,324,890.      Specification of Letters Patent.      Patented Dec. 16, 1919.

Application filed February 24, 1919. Serial No. 278,675.

*To all whom it may concern:*

Be it known that I, WILLIAM ARTHUR GLENN, a citizen of the United States, residing at Washington, in the District of Columbia, have invented new and useful Improvements in Auto Attachments, of which the following is a specification.

This invention relates to improvements in means for connecting a driving member to a driven member and the principal object of the invention is to provide means to cushion the shock of sudden transmissions of motion or arresting of motion from one part to the other so as to reduce wear and prevent damage to the mechanism.

The invention is more particularly adapted for use on automobiles though, of course, I do not wish to be limited to this application of the invention.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view of the invention;

Fig. 2 is an end view with the shaft in section and one of the cover plates removed;

Fig. 3 is a perspective view of one of the lug-carrying members;

Fig. 4 is a face view of the other member;

Fig. 5 is a face view of the cover plate.

In these views 1 indicates the driving shaft and 2 the driven shaft. The driving shaft has a cylindrical member 3 keyed thereon and on one face of this member is provided an annular groove 4 of semicircular formation in cross section. The member is also provided with a flat bottom groove 5 which is of smaller diameter than the groove 4 and the two grooves are separated by an annular rib 6. Circular lugs 7 are carried by said member 3 and said lugs are located in the groove 4. The lugs project from said groove, as shown in Fig. 1. Said lugs are spaced apart so as to divide the groove into sections. A head or cylindrical member 8 is secured to the shaft 2, and said head has secured to its periphery a number of cylindrical lugs 9 which lie in the groove 4. These lugs are so arranged that each lug lies between a pair of the lugs 7 on the other member 3. A coiled spring 10 is located between each of the lugs 7 and 9 and in order to provide a proper seat for the ends of the springs said lugs are of slightly tapered shape, as shown. A cover plate 11 has its outer flange bolted to the outer flange of the member 3 and said cover plate is provided with a boss 12 for engaging the tubular boss 13 of the member 8. Said cover plate is provided with an annular groove 14 of semicircular shape in cross section for inclosing the projecting parts of the lugs and springs, and said plate is also provided with a flat annular part 15 which lies opposite the flat groove 5. The cylindrical part of the member 8 will lie between said parts 5 and 15 and ballbearings 16 are placed within the grooves 5 and 15 and bear against the faces of the member 8.

It will thus be seen that when the driving shaft begins to rotate, the movement of the lugs 7 on the member 3 will compress the springs and this compression of the springs will act against the lugs 9 and thus the rotary movement will be communicated to the shaft 2. The springs will act to absorb all shock due to the sudden stopping or starting of the driving shaft or to a sudden stopping of the driven shaft.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a driving member and a driven member, a head on the driving member having a semicircular annular groove in one face, lugs on said head located in said groove, a head on the driven member, lugs on the periphery thereof and lying in said groove, coiled springs in said groove with their ends engaging the lugs and a cover plate secured to the first mentioned head and having a semicircular groove therein inclosing the lugs and springs.

2. A device of the class described comprising a driven member, a head therein having an annular semicircular groove therein, lugs on said member located within the groove, a head on the other member, lugs in the periphery of said head and projecting into the groove, coiled springs within said groove with their ends engaging said lugs, a cover plate carried by the first mentioned head and having an annular groove therein for inclosing the lugs and springs and ball-bearings on each side of the head of the driven member and engaging the head on the other member and the cover plate.

In testimony whereof I affix my signature.

WILLIAM ARTHUR GLENN.